A. NELSON.
SUBMERGED HEATER.
APPLICATION FILED MAR. 21, 1917.

1,240,477.

Patented Sept. 18, 1917.

Inventor
A. Nelson.

UNITED STATES PATENT OFFICE.

AL NELSON, OF RIPLEY, TENNESSEE.

SUBMERGED HEATER.

1,240,477. Specification of Letters Patent. Patented Sept. 18, 1917.

Application filed March 21, 1917. Serial No. 156,311.

*To all whom it may concern:*

Be it known that I, AL NELSON, a citizen of the United States, residing at Ripley, in the county of Lauderdale and State of Tennessee, have invented certain new and useful Improvements in Submerged Heaters, of which the following is a specification.

My invention relates to new and useful improvements in heaters and more particularly heaters of the submerged type, the primary object of my invention being the provision of a submerged heater capable of burning liquid fuel and adapted to be disposed within the body of the water or other liquid to be heated.

A still further object which I have in view is the provision of a heater including a main body or casing and a burner supported within the casing, the burner including a fuel container into which air may be forced, under pressure, to properly feed fuel to the burner itself.

Another object which I have in view is the provision of suitable means for supporting the burner and fuel container within the body of the heater so that they may be removed at any time.

With these and other objects in view, my invention will be more fully described, illustrated in the accompanying drawing, and then specifically pointed out in the claims which are attached to and form a part of this application.

In the drawing.

Corresponding and like parts are referred to in the following description and indicated in all the views of the drawing by the same reference characters.

My improved heater includes a substantially cylindrical body or casing 10 preferably formed of sheet metal of suitable weight closed at its lower end and open at its upper end. This casing is to be positioned in the water or other liquid to be heated so that its open end is above the liquid level and if the liquid is sufficiently shallow the bottom of the casing may rest upon the bottom of the liquid container. Preferably, however, the casing, adjacent its upper end, is provided exteriorly with a supporting hook 11 by means of which it may be supported or hung within the container of the liquid to be heated.

Figure 1:
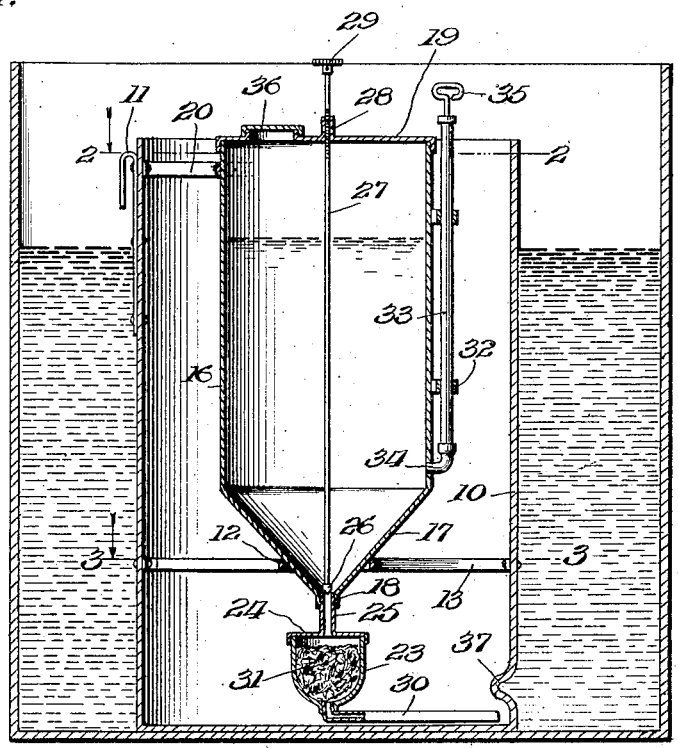
Figure 1 is a central vertical sectional view taken through my improved heater, showing it in use.
Figure 2:
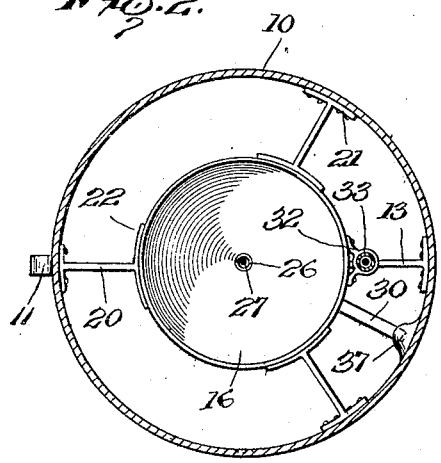
Fig. 2 is a transverse sectional view taken on the line 2—2 of Fig. 1, illustrating the heater structure.
Figure 3:
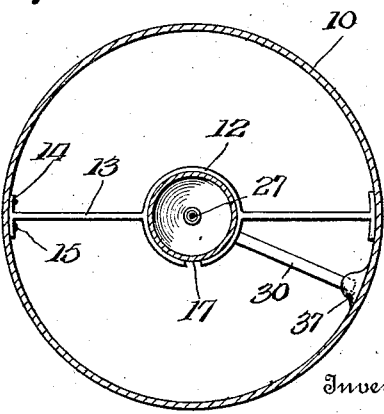
Fig. 3 is a corresponding view taken on the line 3—3 of Fig. 1.

An open supporting ring 12 has diametrically extending arms 13 terminating in ears 14 which engage against the inner face of the casing 10 to which they are secured by rivets or other suitable fastening devices 15 so that the supporting ring is held in parallel spaced relation to the bottom of the container, as clearly shown in Fig. 1. This supporting ring in turn receives the fuel container 16 which, as shown in Fig. 1, is preferably cylindrical in shape and of less diameter and height than the body 10. The lower end of this fuel container or reservoir tapers to provide a funnel shaped discharge portion 17 having an internally threaded discharge nozzle 18, the portion 17 seating in the ring 12 when the parts are assembled. The upper end of the fuel reservoir 16 is externally threaded to receive the threaded flange of a cover 19 and centering braces 20 carried by the casing 10 engage the upper portion of the receptacle to support it in proper position. These centering braces have ears 21 corresponding to the ears 14 by which they are secured to the casing 10 and at their inner ends have arcuate arms 22 engaging against the receptacle 16.

A cup shaped vaporizer 23 has its open upper end closed by a cap 24 having a spout 25 which threads into the discharge spout or neck 18 of the receptacle 16 and the upper end of which forms a valve seat for a needle valve 26 carried by a valve stem 27 which extends axially of the receptacle, being adjustably threaded in a sleeve 28 formed upon the cover 19. This valve stem, at its outer end, is provided with a handle 29 in order that it may be conveniently turned to cause opening of the valve 26 to a more or less extent. A burner tube 30 leads from the lower end of the vaporizer cup 23 and extends laterally or radially of the casing 10 to a point adjacent the peripheral wall thereof so that flame from fuel passing through this burner tube will be directed against the wall of the casing. This vaporizing cup 23 is filled or partially filled with any suitable form of fibrous packing 31, such as mineral wool or the like.

Vertically alined brackets 32 support a hand pump 33 arranged to discharge into the receptacle 27, as shown at 34, and having an operating plunger 35 projecting above the upper end of the fuel receptacle.

In operation, the fuel receptacle 16 is partially filled with a suitable liquid fuel, such as gasolene, and the valve 26 is opened to permit the desired feed of such fuel to the absorbent material contained in the vaporizing cup 23. This feed of fuel is insured by manipulating the pump 33 to create any desired air pressure within the fuel container. By this means, suitable feed of fuel through the tube 30 is insured and the fuel escaping from this tube may be ignited in the usual manner. The fuel receptacle with its burner is then lowered into the casing 10, the vaporizing cup passing through the supporting ring and the burner tube through the opening in such ring until the parts reach the position shown in the drawing. The casing and inclosed burner are then positioned in the liquid to be heated, either by resting the casing directly upon the bottom of the liquid holding vessel or by hanging it within such vessel by means of the hook 11. It will be obvious, therefore, that I have provided a forced feed for the fuel. If desired, however, the cover 19 may be formed with a filling opening having a closure cap 36 and this cap may be loosened to permit passage of air so that the device may be employed with gravity feed, if wished, the pump, of course, not being operated under such circumstances. Preferably also, if the fuel is fed by gravity the major portion of the packing in the cup 23 will be removed to insure suitable flow of fuel.

I also provide the casing 10, near its lower end, with an indentation 37 which overhangs the end of the burner so that the flame therefrom is directed upwardly against the inwardly projecting surface as this causes a more rapid heating of the water. After the fuel container and burner have been lowered into the casing they may be readily turned to bring the burner beneath this indentation.

Although I have illustrated and described my invention in all its details of construction, it will of course be understood that I do not wish to limit myself to such details but reserve the right to make any changes, within the scope of the appended claims, without in the slightest degree departing from the spirit of my invention.

Having thus described the invention, what is claimed as new is:

1. In a heater, a casing closed at its lower end and open at its upper end, an open supporting ring disposed substantially centrally and adjacent the lower end of the casing, arms extending from the ring and fixed to the casing to support the ring, centering arms extending inwardly from the casing near its upper end, a fuel receptacle having its upper portion centered between the arms and its lower portion engaging in the supporting ring, a vaporizing cup passable through the supporting ring and communicating with the lower portion of the receptacle, a fibrous packing in the cup, and a burner tube leading from the cup in a lateral direction to a point adjacent the wall of the casing.

2. In a heater, a casing closed at its lower end and open at its upper end, an open supporting ring disposed substantially centrally and adjacent the lower end of the casing, arms extending from the ring and fixed to the casing to support the ring, centering arms extending inwardly from the casing near its upper end, a fuel receptacle having its upper portion centered between the arms and its lower portion engaging in the supporting ring, a vaporizing cup passable through the supporting ring and communicating with the lower portion of the receptacle, a fibrous packing in the cup, a burner tube leading from the cup in a lateral direction to a point adjacent the wall of the casing, and a valve controlling flow of fuel from the receptacle to the cup.

3. In a heater, a casing closed at its lower end and open at its upper end, an open supporting ring disposed substantially centrally and adjacent the lower end of the casing, arms extending from the ring and fixed to the casing to support the ring, centering arms extending inwardly from the casing near its upper end, a fuel receptacle having its upper portion centered between the arms and its lower portion engaging in the supporting ring, a vaporizing cup passable through the supporting ring and communicating with the lower portion of the receptacle, a fibrous packing in the cup, a burner tube leading from the cup in a lateral direction to a point adjacent the wall of the casing, a valve controlling flow of fuel from the receptacle to the cup, and a pump disposed to force air into the receptacle.

4. In a heater, a casing closed at its lower end and formed adjacent such end with an indentation, a fuel receptacle supported within the casing, and a burner having operative connection with the fuel receptacle and disposed immediately below the indentation of the casing.

5. In a heater, a casing closed at its lower end, a ring supported within the casing, arms projecting into the casing, a fuel receptacle seating at one end in the ring and centered by the arms, and a burner disposed within the casing and having connection with the fuel receptacle.

6. In a heater, a casing closed at its lower end, an open supporting ring held adjacent the lower end of the casing, a fuel receptacle having its lower portion engaging in the supporting ring, centering means for the receptacle, and a burner tube having operative connection with the fuel receptacle and projecting laterally to a point adjacent the casing, the burner tube being passable through the opening of the ring when positioning the receptacle.

In testimony whereof I affix my signature.

AL NELSON. [L. S.]

Copies of this patent may be obtained for five cents each, by addressing the "Commissioner of Patents, Washington, D. C."